(12) United States Patent
Liu

(10) Patent No.: US 12,440,043 B2
(45) Date of Patent: Oct. 14, 2025

(54) PORTABLE INFLATABLE MAT STRUCTURE

(71) Applicant: CATHAY CONSOLIDATED INC., Yilan County (TW)

(72) Inventor: Tsung Hsi Liu, Yilan County (TW)

(73) Assignee: CATHAY CONSOLIDATED INC., Yilan County (TW)

( * ) Notice: Subject to any disclaimer, the term of this patent is extended or adjusted under 35 U.S.C. 154(b) by 101 days.

(21) Appl. No.: 18/514,857

(22) Filed: Nov. 20, 2023

(65) Prior Publication Data

US 2025/0160532 A1    May 22, 2025

(51) Int. Cl.
*A47C 27/08*  (2006.01)

(52) U.S. Cl.
CPC .......... *A47C 27/087* (2013.01); *A47C 27/081* (2013.01)

(58) Field of Classification Search
CPC ..... A47C 27/087; A47C 27/081; A47C 27/08; A47G 9/1027; A61G 13/1265; A61G 7/05769; A61G 7/05776; A61G 7/1021
See application file for complete search history.

(56) References Cited

U.S. PATENT DOCUMENTS

| | | | | |
|---|---|---|---|---|
| 616,816 A * | 12/1898 | Young | ................. | A47C 27/081 5/712 |
| 3,029,109 A * | 4/1962 | Nail | ......................... | A47C 4/54 297/DIG. 3 |
| 3,790,975 A * | 2/1974 | Philipp | ................. | A47C 27/087 5/711 |
| 4,823,417 A * | 4/1989 | Fukuichi | ............... | A47C 27/087 5/655.3 |
| 6,775,868 B1 * | 8/2004 | Mileti | ................... | A47C 27/001 5/710 |
| 7,462,142 B1 * | 12/2008 | Gordon | .............. | A63B 21/4037 482/142 |
| 11,964,460 B1 * | 4/2024 | Xia | ......................... | B32B 5/263 |
| 2007/0124864 A1 * | 6/2007 | Lau | ....................... | A47C 27/081 5/711 |
| 2008/0022460 A1 * | 1/2008 | Yang | ..................... | A47C 27/081 5/932 |
| 2012/0031265 A1 * | 2/2012 | Song | .................... | A47C 27/087 92/145 |
| 2016/0166077 A1 * | 6/2016 | Liu | ....................... | A47C 27/081 5/710 |
| 2019/0231085 A1 * | 8/2019 | Huang | .................... | B29C 65/04 |
| 2020/0100598 A1 * | 4/2020 | Huang | ................. | A47C 27/087 |
| 2022/0117405 A1 * | 4/2022 | Huang | ................. | B68G 15/00 |
| 2022/0274351 A1 * | 9/2022 | Huang | ................. | B29C 66/438 |
| 2022/0346564 A1 * | 11/2022 | Huang | ................. | A47C 27/081 |

(Continued)

*Primary Examiner* — David E Sosnowski
(74) *Attorney, Agent, or Firm* — HDLS IPR SERVICES; Chun-Ming Shih

(57) ABSTRACT

A portable inflatable mat includes an upper covering layer and a lower covering layer. A plurality of light and thin connecting strips are connected between the upper covering layer and the lower covering layer. Particularly, a wavy blocking layer is provided between the upper covering layer and the lower covering layer, thereby reducing air convection and blocking lower-temperature radiation. A support layer is provided below the blocking layer to achieve a limit function and keep heat trapped. The mat is able to block air convection and low-temperature radiation, making it ideal for camping and polar environments.

6 Claims, 6 Drawing Sheets

(56) References Cited

U.S. PATENT DOCUMENTS

| | | | |
|---|---|---|---|
| 2023/0349184 A1* | 11/2023 | Huang | A47C 27/081 |
| 2023/0389729 A1* | 12/2023 | Lee | A47C 27/12 |
| 2024/0122351 A1* | 4/2024 | Liu | A47C 27/087 |
| 2024/0225322 A1* | 7/2024 | Lee | A47G 9/062 |
| 2024/0260763 A1* | 8/2024 | Xia | D03D 1/02 |
| 2025/0031864 A1* | 1/2025 | Tang | A47C 27/087 |
| 2025/0072629 A1* | 3/2025 | Lin | A47C 27/081 |
| 2025/0082111 A1* | 3/2025 | Zeng | B32B 5/028 |
| 2025/0120517 A1* | 4/2025 | Zeng | A47C 27/002 |

\* cited by examiner

PORTABLE INFLATABLE MAT STRUCTURE

FIELD OF THE INVENTION

The present invention relates to a portable inflatable mat structure, and more particularly to a mat that is light in weight and capable of blocking air convection and low-temperature radiation.

BACKGROUND OF THE INVENTION

Traditional camping and hiking activities are no longer enough to satisfy experienced and professional campers. Breaking through limitations or challenging the limits of the human body are goals that players aspire to achieve. Professional campers know the importance of equipment. In addition to adequate food and water, it is important to keep warm. When the day's activities are over, it is important to have proper rest in order to have the stamina to cope with the next day's journey. The ambient temperature is lower at night. These areas are always minus tens of degrees Celsius. People are susceptible to frostbite and hypothermia. If there are no enough equipages to keep out the cold, a person may suffer from hypothermia, which will cause shock, cardiac arrest and other fatal dangers. The human body is in a resting state when sleeps. If a person lies directly on the ground, the low-temperature conduction of the ground will increase the chance of suffering from hypothermia. Thus, people often put a layer of aluminum foil pad under the sleeping mat to reduce the low-temperature conduction of the ground. However, as to the single-layer aluminum foil pad, the effect of keeping out the cold is not good. If it is used in polar environments, the effect of keeping out the cold is poor. Furthermore, outdoor activities, such as camping, need a lot of equipages. It is required for all equipages to be light-weight and small in size, which may affect functional improvements. Existing sleeping mats for camping are not suitable for use in polar environments due to inadequate temperature blocking effect or being too large and heavy.

The structure and effectiveness of the existing mats are still not ideal and need to be improved. Accordingly, the inventor of the present invention has devoted himself based on his many years of practical experiences to solve these problems.

SUMMARY OF THE INVENTION

The primary object of the present invention is to provide a portable inflatable mat structure. The structure is made of light and thin sheets that are connected to each other, thus meeting the basic needs of lightness and portability.

Another object of the present invention is to provide a portable inflatable mat structure, which has a plurality of layered spaces therein. Thus, the mat can reduce air convection and block low-temperature radiation greatly. When the mat is used for camping, it can resist the low temperature on the ground effectively and prevent the user from suffering hypothermia.

A further object of the present invention is to provide a portable inflatable mat structure, which has wavy blocking layers therein for reducing air convection and blocking low-temperature radiation.

A yet further object of the present invention is to provide a portable inflatable mat structure, which has a support layer therein for supporting the blocking layer, so as to improve the effects of reducing air convection and blocking low-temperature radiation. The area between the support layer and the upper covering layer keeps heat trapped for a better warmth retention property.

In order to achieve the forgoing objects, the mat provided by the present invention is an inflatable bladder structure, comprising an upper covering layer and a lower covering layer. The peripheries of the upper covering layer and the lower covering layer are joined and closed. A plurality of connecting strips are connected between the upper covering layer and the lower covering layer.

In an embodiment of the present invention, the connecting strip is in the form of a light and thin sheet. The top end of the connecting strip is connected to the bottom of the upper covering layer and is coupled to a coupling portion. The bottom end of the connecting strip is connected to the top of the lower covering layer and is coupled to a coupling portion. Between every adjacent two of the connecting strips, a blocking layer is provided below the lower edge of the upper covering layer, and another blocking layer is provided above the upper edge of the lower covering layer. Each blocking layer is in the form of an elongate sheet, and has a wavy shape.

In an embodiment of the present invention, the blocking layer is a large-area integral structure, i.e., the area of the blocking layer is about equal to that of the upper covering layer and the lower covering layer. The blocking layer has a plurality of notches. A support layer is provided on the lower edge of the blocking layer below the upper covering layer. The connecting strips, the support layer and the upper covering layer are coupled to a first coupling portion via the notches.

In an embodiment, the blocking layer is made of a polyester film material with high reflectivity and low absorptivity, but not limited thereto.

In an embodiment, the support layer is made of a thermoplastic polyurethane material, but not limited thereto.

DETAILED DESCRIPTION OF THE PREFERRED EMBODIMENTS

Embodiments of the present invention will now be described, by way of example only, with reference to the accompanying drawings.

Figure 1:
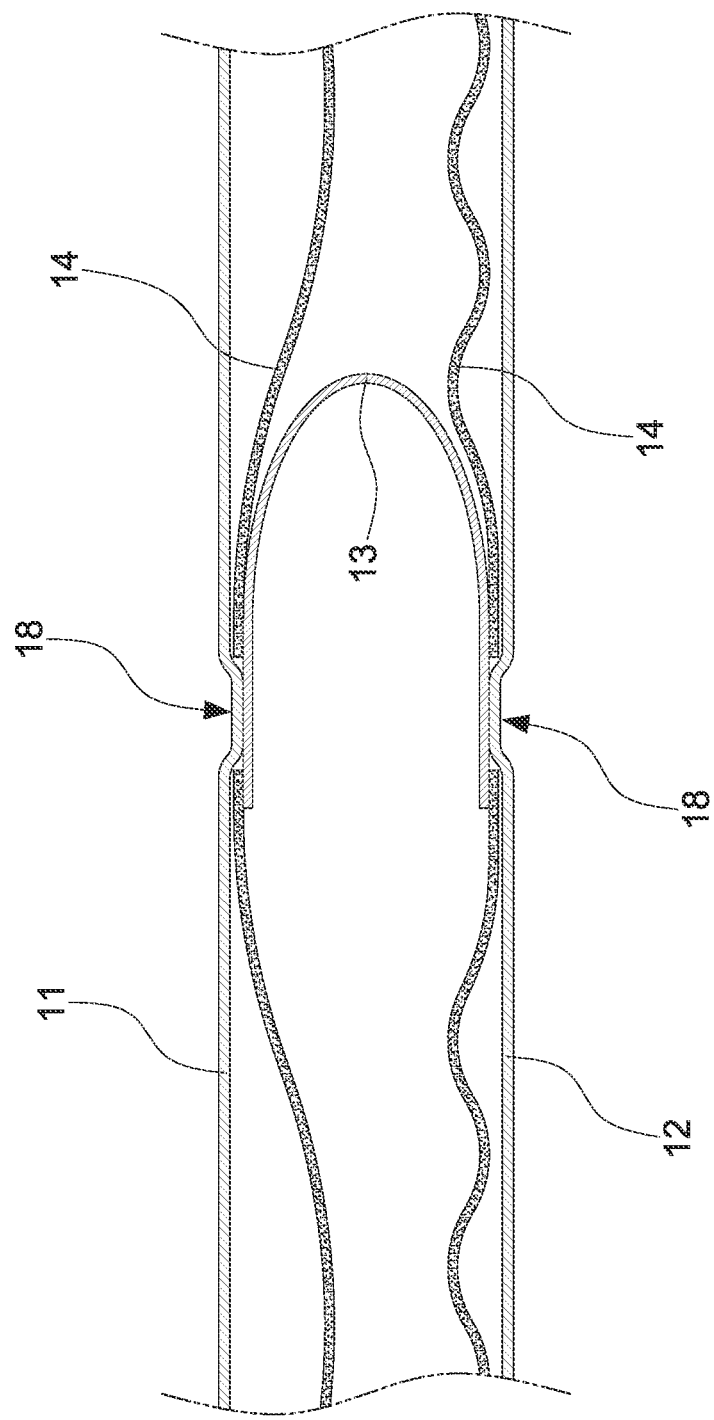
FIG. 1 is a partial cross-sectional view according to a first embodiment of the present invention.
Figure 2:
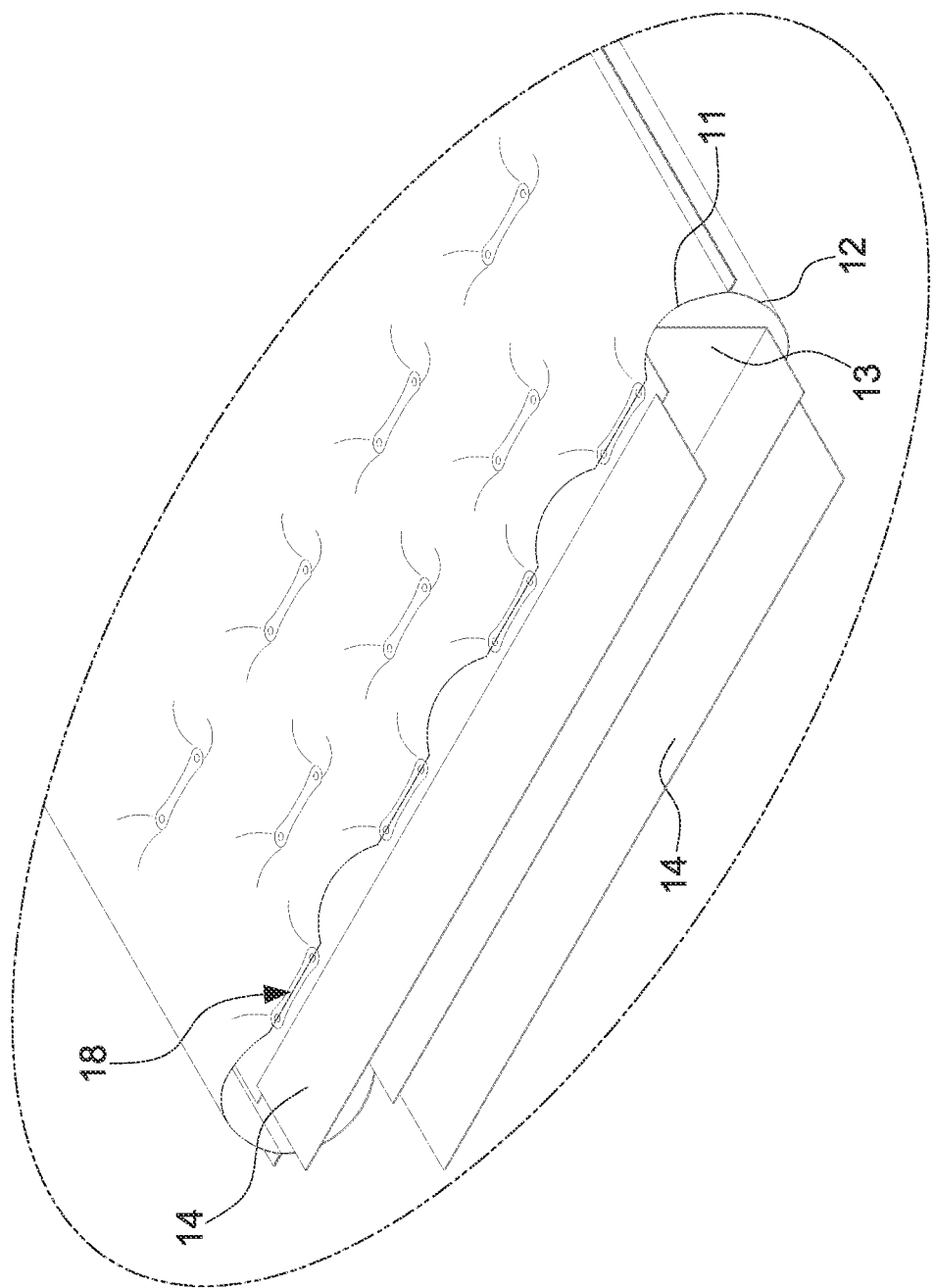
FIG. 2 is a partial perspective view according to the first embodiment of the present invention.
Figure 3:
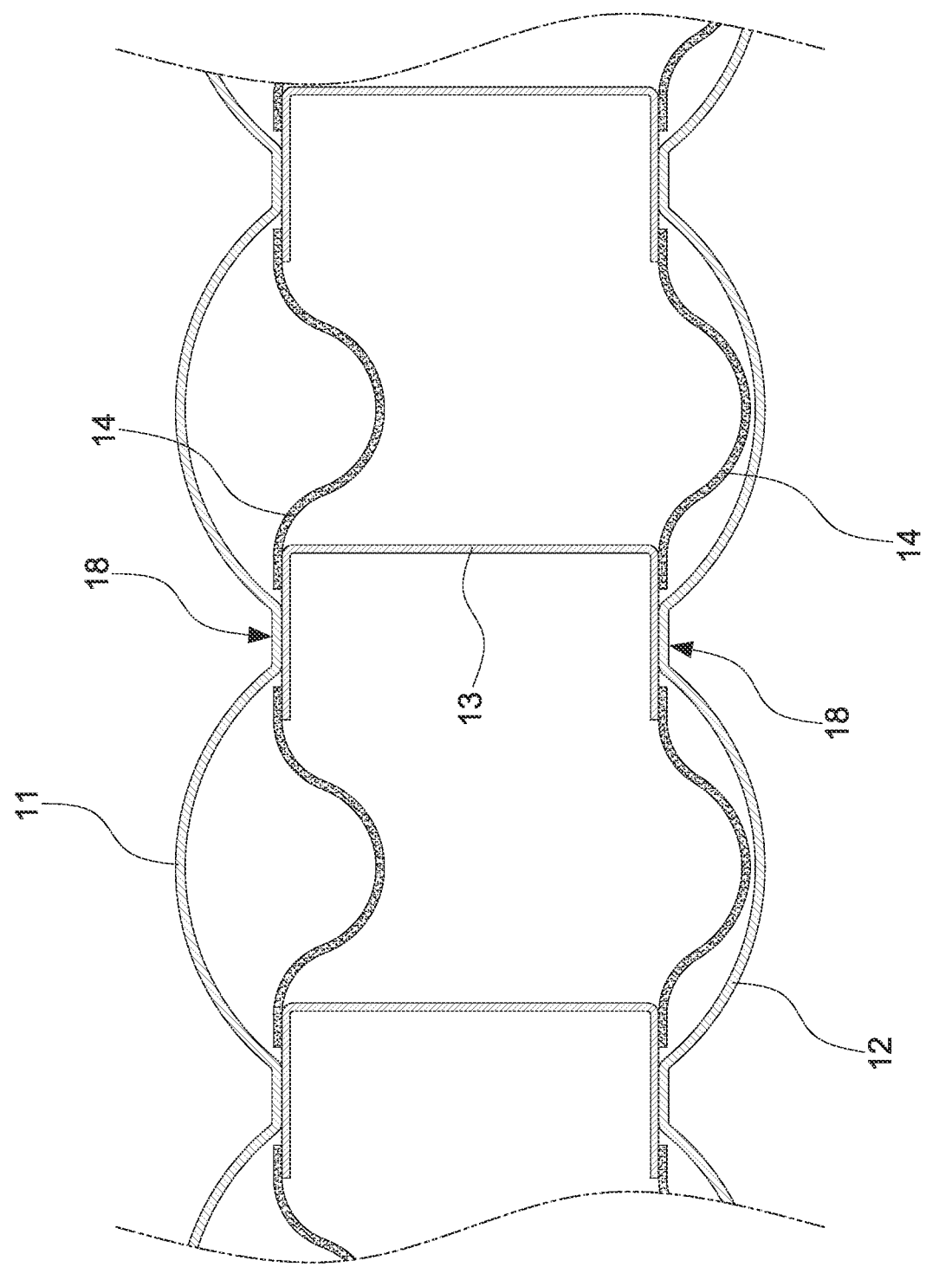
FIG. 3 is a schematic view according to the first embodiment of the present invention when inflated.

FIG. 1, FIG. 2 and FIG. 3 illustrate a first embodiment of the present invention. The present invention discloses a portable inflatable mat structure, which is an inflatable bladder structure. The portable inflatable mat structure comprises an upper covering layer 11, a lower covering layer 12, and a space defined between the upper covering layer 11 and the lower covering layer 12. The peripheries of the upper covering layer 11 and the lower covering layer 12 are joined and closed. A plurality of connecting strips 13 are connected between the upper covering layer 11 and the lower covering layer 12.

The connecting strip 13 is in the form of a light and thin sheet. The top end of the connecting strip 13 is connected to the bottom of the upper covering layer 11 and is coupled to a coupling portion 18. The bottom end of the connecting strip 13 is connected to the top of the lower covering layer 12 and is coupled to a coupling portion 18. Between every adjacent two of the connecting strips 13, a blocking layer 14 is provided below the lower edge of the upper covering layer 11, and another blocking layer 14 is provided above the upper edge of the lower covering layer 12. Each blocking layer 14 is in the form of an elongate sheet having a wavy shape.

As shown in FIG. 3, when the mat is inflated, the area between the upper covering layer 11 and the upper blocking layer 14, the area between the two blocking layers 14, and the area between the lower covering layer 12 and the lower blocking layer 14 are separated by the two blocking layers 14 and are independent. The airflow in each area cannot be convected or exchanged, so as to block air convection and low-temperature radiation.

Figure 4:
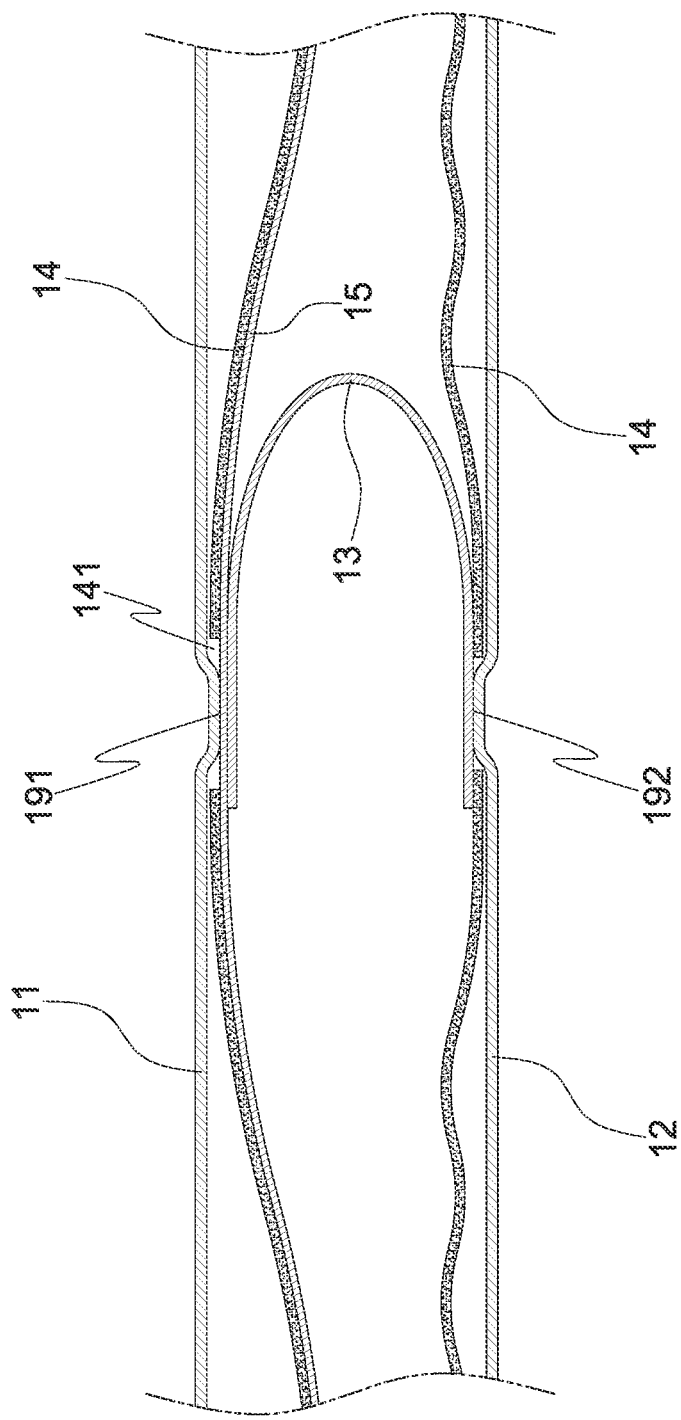
FIG. 4 is a partial cross-sectional view according to a second embodiment of the present invention.
Figure 5:
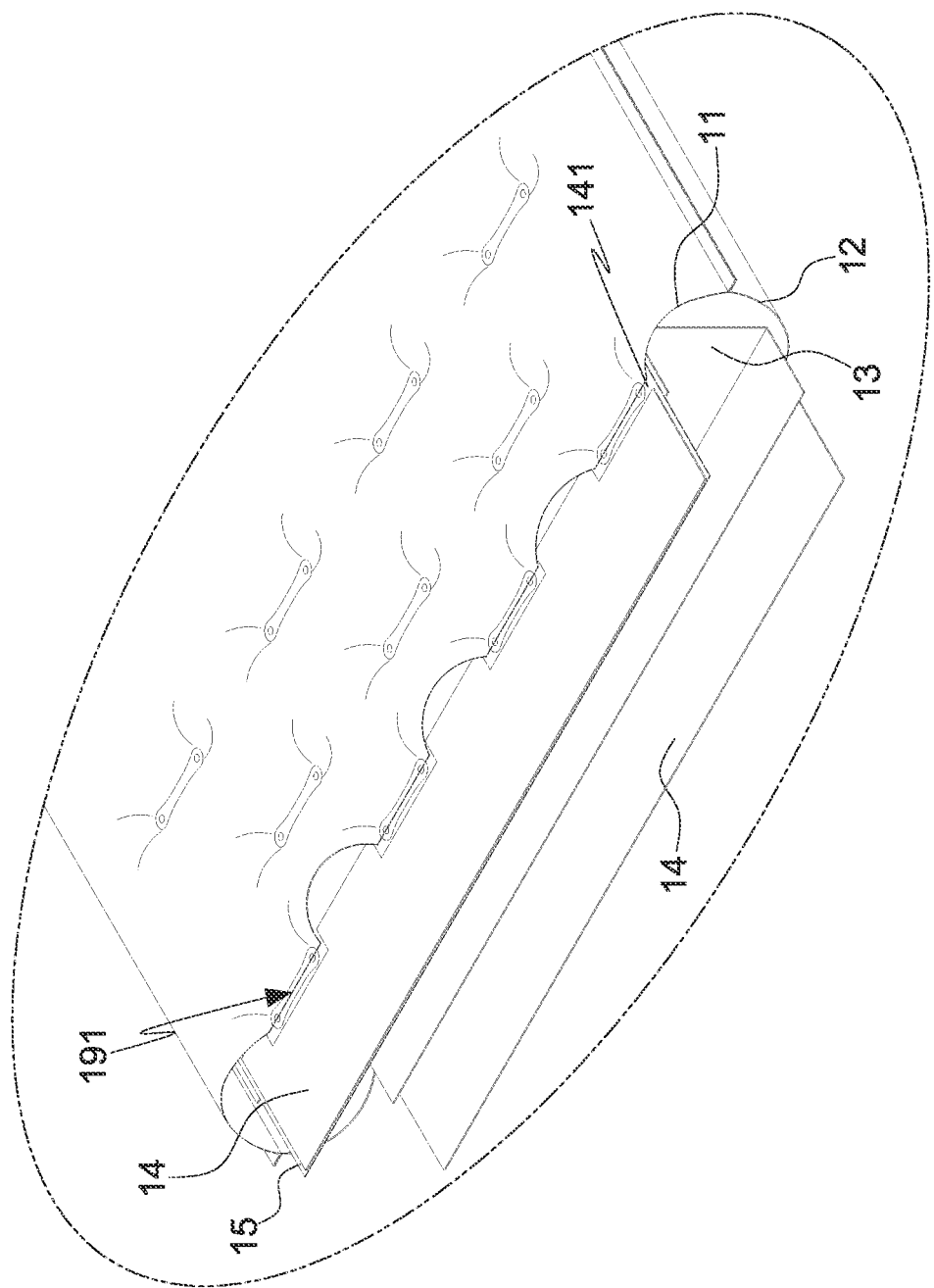
FIG. 5 is a partial perspective view according to the second embodiment of the present invention.
Figure 6:
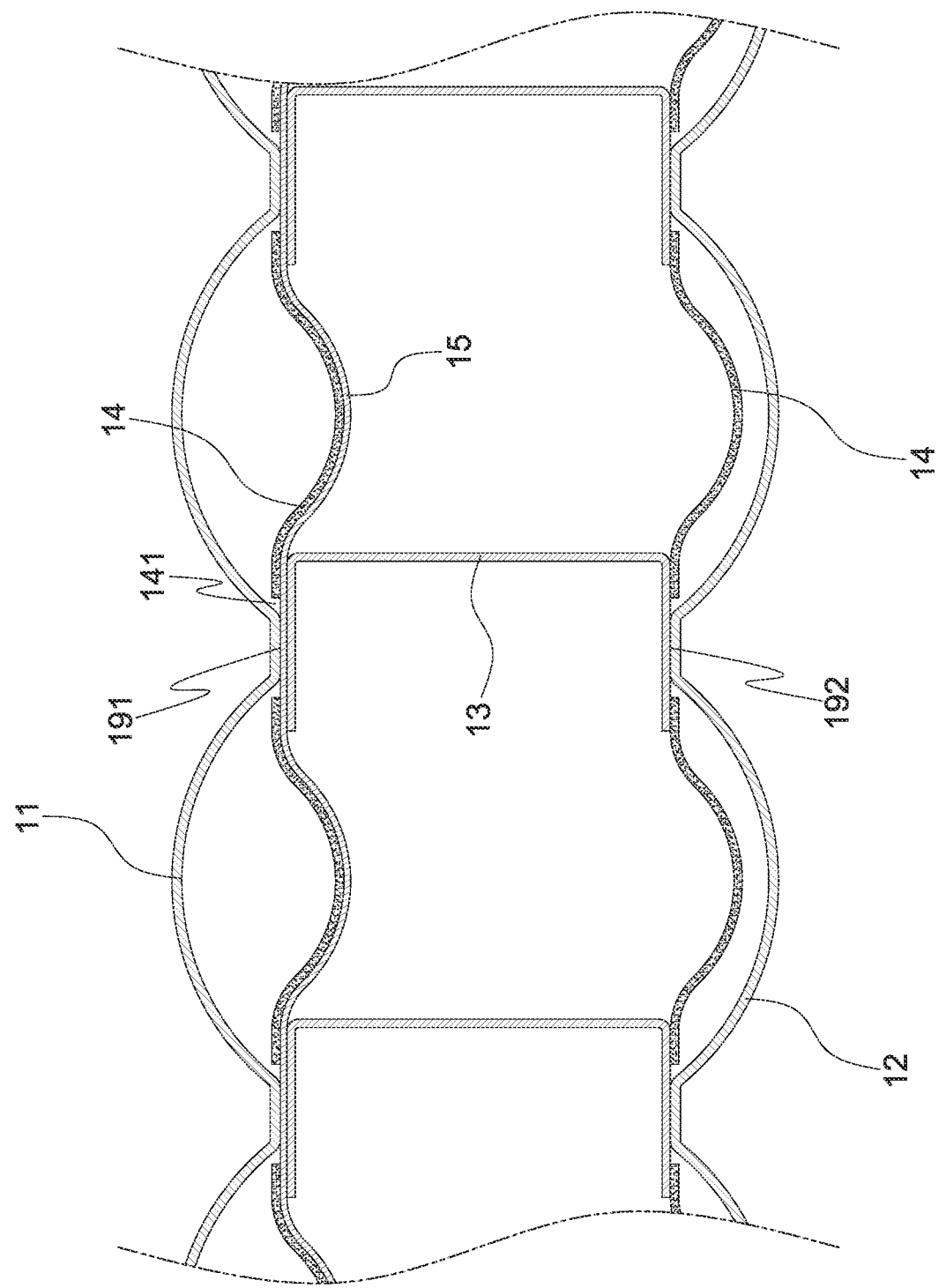
FIG. 6 is a schematic view according to the second embodiment of the present invention when inflated.

FIG. 4. FIG. 5 and FIG. 6 illustrate a second embodiment of the present invention. The second embodiment is substantially similar to the first embodiment with the exceptions described hereinafter. The blocking layer 14 is a large-area integral structure, i.e., the area of the blocking layer 14 is about equal to that of the upper covering layer 11 and the lower covering layer 12. The blocking layer 14 has a plurality of notches 141. A support layer 15 is provided on the lower edge of the blocking layer 14 below the upper covering layer 11. The connecting strips 13, the support layer 15 and the upper covering layer 11 are coupled to a first coupling portion 191 via the notches 141. The connecting strips 13 and the lower covering layer 12 are coupled to a second coupling portion 192. Compared to the first embodiment, since the blocking layer 14 is an integral sheet, instead of separate plural sheets, the second embodiment has the advantages of mass production and increased productivity. The support layer 15 is configured to limit the height and spacing of the upper blocking layer 14 and support the upper blocking layer 14 effectively to enhance the effect of blocking low-temperature radiation, such that the area between the support layer 15 and the upper covering layer 11 keeps heat trapped for a better warmth retention property.

In the present invention, the blocking layer 14 has a Z-shaped warped structure to increase coverage. Besides, the layered wavy structure can reduce air convection and block low-temperature radiation. Thus, when the mat is used in a polar environment, it can resist the low temperature of the ground effectively and prevent the user from suffering hypothermia.

What is claimed is:

1. A portable inflatable mat structure, comprising:
an upper covering layer formed with a plurality of first coupling portions, and a lower covering layer formed with a plurality of second coupling portions, peripheries of the upper covering layer and the lower covering layer being joined and closed;
a plurality of connecting strips being connected between the upper covering layer and the lower covering layer, each of the plurality of connecting strips being in form of a sheet, a top end of the sheet being connected and coupled to a bottom of the upper covering layer, a bottom end of the sheet being connected and coupled to a top of the lower covering layer;
a support layer provided below the upper covering layer to attach on the top end;
an upper blocking layer attached on the support layer and formed with a plurality of first openings, wherein the plurality of first coupling portions are directly attached on support layer via the plurality of openings, respectively; and
a lower blocking layer provided above the lower covering layer to attached on the bottom end and formed with a plurality of second openings, wherein the plurality of second coupling portions are attached on the bottom end via the plurality of second openings, respectively.

2. The portable inflatable mat structure as claimed in claim 1, wherein the blocking layer has a wavy shape.

3. The portable inflatable mat structure as claimed in claim 1, wherein the blocking layer is in the form of an elongate sheet located between every adjacent two connecting strips.

4. The portable inflatable mat structure as claimed in claim 1, wherein the blocking layer has an area about equal to that of the upper covering layer.

5. The portable inflatable mat structure as claimed in claim 1, wherein the blocking layer is made of a polyester film material.

6. The portable inflatable mat structure as claimed in claim 1, wherein the support layer is made of a thermoplastic polyurethane material.

* * * * *